(12) United States Patent
Hawks

(10) Patent No.: US 8,974,672 B2
(45) Date of Patent: Mar. 10, 2015

(54) SELF-CONTAINED IRRIGATION POLISHING SYSTEM

(75) Inventor: Wayne R. Hawks, Columbia, MO (US)

(73) Assignee: Wasserwerk, Inc., Columbia, MO (US)

(*) Notice: Subject to any disclaimer, the term of this patent is extended or adjusted under 35 U.S.C. 154(b) by 762 days.

(21) Appl. No.: 13/219,080

(22) Filed: Aug. 26, 2011

(65) Prior Publication Data

US 2013/0048572 A1 Feb. 28, 2013

(51) Int. Cl.
*C02F 3/00* (2006.01)
*C02F 1/66* (2006.01)
*C02F 101/32* (2006.01)
*C02F 103/00* (2006.01)

(52) U.S. Cl.
CPC ............ *C02F 1/66* (2013.01); *C02F 2101/32* (2013.01); *C02F 2103/001* (2013.01); *C02F 2103/007* (2013.01); *C02F 2201/005* (2013.01); *C02F 2201/007* (2013.01); *C02F 2209/06* (2013.01); *C02F 2209/22* (2013.01); *C02F 2209/40* (2013.01); *C02F 2301/043* (2013.01); *C02F 2301/046* (2013.01); *C02F 2301/063* (2013.01); *C02F 2303/24* (2013.01)
USPC ........... 210/667; 210/694; 210/252; 210/258; 210/264

(58) Field of Classification Search
USPC ........................ 210/667, 694, 252, 258, 264
See application file for complete search history.

(56) References Cited

U.S. PATENT DOCUMENTS

| | | | |
|---|---|---|---|
| 4,652,381 A | 3/1987 | Inglis | |
| 4,664,795 A * | 5/1987 | Stegall et al. | 210/202 |
| 4,997,568 A | 3/1991 | Vandervelde et al. | |
| 5,133,619 A | 7/1992 | Murfae et al. | |
| 5,281,332 A | 1/1994 | Vandervelde et al. | |
| 5,417,861 A * | 5/1995 | Burnham | 210/609 |
| 5,514,277 A | 5/1996 | Khudenko | |
| 5,632,896 A | 5/1997 | Vandervelde et al. | |
| 5,814,227 A | 9/1998 | Pavlis | |
| 6,126,817 A | 10/2000 | Duran et al. | |
| 6,190,548 B1 * | 2/2001 | Frick | 210/170.08 |
| 7,081,203 B2 | 7/2006 | Helm | |
| 7,288,188 B2 | 10/2007 | Al-Assfour | |
| 7,455,780 B1 * | 11/2008 | Joyner et al. | 210/679 |
| 7,758,747 B2 | 7/2010 | Bryant | |
| 7,857,966 B2 | 12/2010 | Duran et al. | |
| 2001/0047956 A1 | 12/2001 | Albiston et al. | |
| 2005/0034651 A1 * | 2/2005 | Albiston et al. | 117/68 |
| 2006/0163178 A1 | 7/2006 | Crawford et al. | |
| 2007/0272609 A1 * | 11/2007 | Suri et al. | 210/603 |
| 2009/0032446 A1 | 2/2009 | Wiemers et al. | |
| 2009/0057237 A1 | 3/2009 | Slabaugh et al. | |
| 2009/0230059 A1 | 9/2009 | McGuire et al. | |

(Continued)

OTHER PUBLICATIONS

Best Management Products webpage for BMP SNOUT®, Feb. 3, 2011, 1 page, http://snoutsdirect.com.

*Primary Examiner* — Chester Barry
(74) *Attorney, Agent, or Firm* — Husch Blackwell LLP

(57) ABSTRACT

A self-contained water polishing system includes at least a first containment basin that has an inlet for inflow of water from a collection source and contains calcium carbonate for treatment of water flowing through the system; at least a first polishing basin in communication with the containment basin and that contains at least a first pollutant collection substrate for treatment of water flowing through the system; and a vacuum pumping system in fluid communication with the containment and polishing basins that draws water through the polishing system.

20 Claims, 8 Drawing Sheets

(56) References Cited

U.S. PATENT DOCUMENTS

| | | |
|---|---|---|
| 2011/0017677 A1 | 1/2011 | Evans |
| 2011/0127223 A1 | 6/2011 | Astley et al. |
| 2011/0290721 A1* | 12/2011 | Aho .............................. 210/605 |
| 2012/0006762 A1 | 1/2012 | McCabe |

* cited by examiner

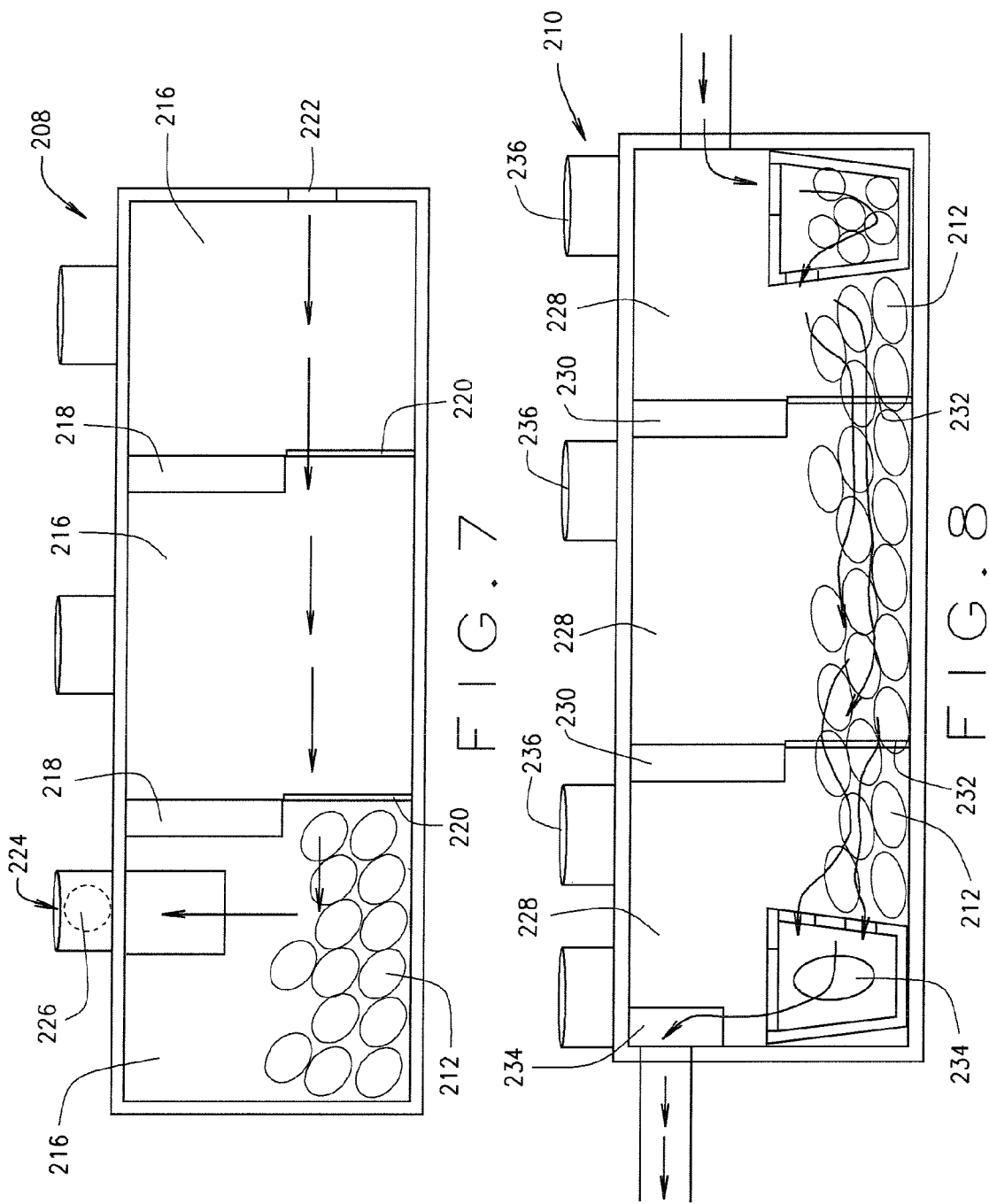

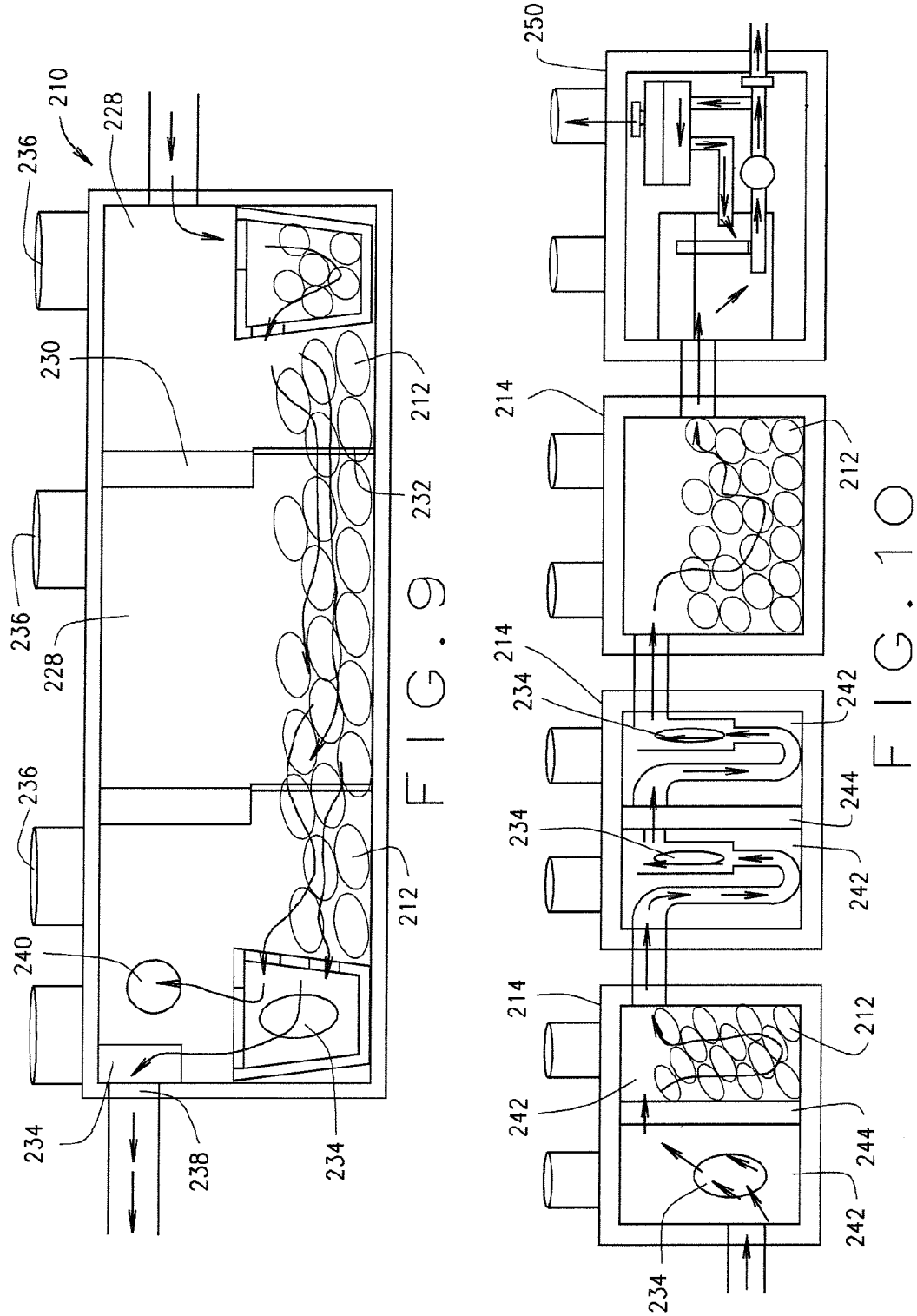

1

SELF-CONTAINED IRRIGATION POLISHING SYSTEM

TECHNICAL FIELD OF THE INVENTION

The present invention relates generally to water treatment and, more particularly, to a scalable water polishing system for storm water run-off and waterways.

BACKGROUND OF THE INVENTION

In the immediate future, clean water availability will become a more important issue than the availability of oil. Estimates have been made that in only twenty years China will only have enough clean water for 20% of its population. Every aspect of society has a cost that is directly related to clean water. An effective means to clean waterways is required. This need is urgent, and the cost of taking action escalates every day. The economic interests of communities are seriously impacted by this need. It is not uncommon for industries to employ water experts to evaluate future alternative sites based on the quality and quantity of water.

Evapotranspiration

Solar heating is the energy input from the sun that drives the hydrologic cycle (sometimes referred to as "evapotranspiration") by evaporating water from oceans and rivers and depositing precipitation on land as rain and snow. FIG. 1 presents an illustrative diagram of the cycle of evapotranspiration. Evapotranspiration and solar heat are central to all water movement, along with gravity, wind, and the rotation of the earth. With the rotation of the earth, water is moved depending on the hemisphere in a certain direction. In the northern hemisphere, water moves in a counter-clockwise motion, while it moves in a clockwise motion in the southern hemisphere.

All fresh water in the world moves continuously in a closed-loop system. No new water is created. Water from precipitation becomes surface water in lakes and rivers. This surface water seeps into the ground to become groundwater. Groundwater, in turn, also feeds surface water. Water circulates from sky to land to ocean and back again. This is the evapotranspiration closed-loop system. With water movement within evapotranspiration, only so much water is available for human use. Annual discharge of the world's water from land to oceans varies, but 40,000 km3 per year is typical. Only 12,500 km3 of runoff is available for human consumption because the majority of runoff occurs in lightly populated areas or seasonal flood plains. Of this 12,500 km3, about 43% is estimated to already be polluted. This means that although two-thirds of our planet is covered in water, only about 5,375 km3—about 13%—of the world's water is available and suitable for human consumption. As is true for all organisms, large amounts of fresh clean water are necessary for survival of a species.

Stream Characteristics

Stream characteristics effect pollution and clean-up. Water movement and flow, sediment, temperature, oxygen, carbon dioxide, and water chemistry are critical stream characteristics that have to be in complete harmony. Water movement is of three types in a stream. These are: (a) turbulence, which occurs in open water, (b) laminar, which is more common close to solid surfaces or in the pores of sediment and silt, and (c) molecular, which also is termed Brownian motion.

Water flow and discharge in a stream is determined by the formula Q=wdv. Water flow (Q) is equal to the width (w) of the stream multiplied by the depth (d) and velocity (v) of the stream. Stream flow is the amount of water flowing down a stream or river. "Instream flow" is the term that defines the flow levels in a stream necessary to protect the aquatic biota of an individual stream. Instream flow is a specific number measured in cubic feet per second (CFS) for a given stream on a month-by-month basis. This number becomes a water right for a specific stream. This regulatory number can be used by ecologists to determine if a stream has sufficient water for new water use. The flow rate contributes to the beauty of a stream, influences ground water levels, as well as other surface water levels in ponds, lakes, and wetland areas. If the water in the stream is good for fish, then it will be suitable for humans.

Stream studies use either the Instream Flow Incremental Methodology (IFIM) or the Toe-width Method, which uses stream bank measurements to study stream flow, to measure instream flow. After establishing the mean annual flow (MAF) of a stream, the Tennant method can be used for environmental flow assessment of a stream. Riffles in a stream have the highest area of macro-invertebrate production and are the first areas to go dry. This implication from low riffle discharge means low food supply and oxygen for the stream biota. The relationship between discharge and wetted perimeters is estimated often for riffles because of the high concentration of macro-invertebrate production in these areas.

Sediment is naturally-occurring material formed by the processes of weathering or erosion and settles on the banks and the bottom of a body of water. It can be classified into three zones: erosion, transfer, and deposition. Erosion begins at the start of a stream. Transfer occurs in the middle of the stream, and deposition of sediment is found at the end of the stream (e.g. Mississippi Delta). "The supply and transport of sediments in a stream are important because they strongly influence the channel dynamics, affect habitat quality experienced by the biota, and can be extremely costly to manage." See Allan and Castillo (2009). Sediment is a source of chronic, often dangerous, pollution (e.g. heavy metals) resulting in stream water quality that will be costly for humans as well as affecting the infrastructure of the stream.

Water temperature is expressed in several units (K, Kelvin; ° C., Celsius; ° F., Fahrenheit). The temperature range in a stream for aquatic viability is between 40° F. and 80° F. at the highest. Many invertebrates and vertebrates such as dipteran larvae, midges, brown trout, and other cold water fish cannot live in temperatures above 80° F. The ideal temperature for a healthy stream is 57.5° F. all year round.

Water chemistry is yet another important characteristic affecting clean up. Rain is an acid with a pH near 5.7 because of its carbon dioxide content and naturally occurring sulfate. In addition, humic acid from decaying plant matter caused a decrease in pH rainwater runoff ranging from 4-5. In urban areas, runoff of salts and other de-icing compounds applied to roads can greatly elevate the salinity of receiving waterways, causing large fluctuations in pH.

PRIOR ART

While there are several systems for water treatment in the prior art, these systems are not scalable to handle applications of varying sizing; are not capable of handling the volumes of water necessary to effectively manage streams and rivers; and do not effectively manage water pH levels.

U.S. Pat. No. 5,814,227 to Pavlis describes an irrigation system designed to address hard water, which damages irrigation systems. Rain water has a pH of approximately 5.7. By filtering rain water with palladium and then an alloy of copper, tin, nickel, and zinc, the water pH is lowered to below 6.4, which prevents precipitation of calcium carbonate downstream of the system. While suitable for irrigation systems, the water produced by the system is detrimental to maintaining a beneficial environment for aquatic life.

U.S. Pat. No. 7,081,203 to Helm describes a wastewater treatment that utilizes filtering media, bacteria, and capillary action to process water passing through the system. It is designed for treatment of wasterwater rather than storm water or streams and rivers and is not capable of treating water at the volumes and rates necessary for storm water, stream, or river applications.

U.S. Pat. Nos. 4,997,568, 5,281,332, and 5,632,896 to Vandervelde et al. describe various systems that utilize conical sand filters for water treatment. Water percolates up through the systems. These systems are also incapable of treating water at the volumes and rates necessary for storm water, stream, or river applications.

Thus, there is a need for a flexible and scalable system for treatment of storm water runoff as well as stream/river water treatment that removes harmful pollutants, eliminates undesirable chemicals, and manages both oxygen and pH levels to enhance the water's suitability for fish and other aquatic life.

SUMMARY OF THE INVENTION

One aspect of the invention generally pertains to a flexible system for polishing storm water run off and stream and river water before returning it to a stream or river.

Another aspect of the invention pertains to a scalable water treatment system that can be adapted to applications of a variety of sizes.

Another aspect of the invention pertains to a system for treating stall water runoff and stream and river water that removes harmful pollutants, eliminates undesirable chemicals, and manages both oxygen and pH levels to enhance the water's suitability for fish and other aquatic life.

In accordance with one or more of the above aspects of the invention, there is provided a self-contained water polishing system that includes at least a first containment basin that has an inlet for inflow of water from a collection source and contains calcium carbonate for treatment of water flowing through the system; at least a first polishing basin in communication with the containment basin and that contains at least a first pollutant collection substrate for treatment of water flowing through the system; and a vacuum pumping system in fluid communication with the containment and polishing basins that draws water through the polishing system.

There is also provided a self-contained water polishing system that includes a run-off water polishing system having at least one collection container; a first containment basin lined with calcium carbonate for treatment of water flowing through the system; a first polishing basin that contains at least a first pollutant collection substrate for treatment of water flowing through the system; and a first vacuum pumping system that draws water through the run-off water polishing system. The polishing system also includes a flowing water polishing system having a collection chamber arranged in the path of a waterway; a second containment basin lined with calcium carbonate for treatment of water flowing through the system; a second polishing basin that contains a second pollutant collection substrate for treatment of water flowing through the system; and a second vacuum pumping system that draws water through the flowing water polishing system.

An associate method of polishing water from run-off or from a waterway is also provided with the steps of collecting water from run-off or from a waterway; directing that water through at least one containment basin lined with calcium carbonate to increase the pH of the water; directing the water through at least one polishing basin that contains at least one pollutant collection substrate; and introducing at least a partial vacuum with a vacuum pumping system to direct the water through the containment and polishing basins.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 7 is a schematic side view of a pump tank according to an embodiment.

FIG. 8 is a schematic side view of a containment basin according to an embodiment.

FIG. 9 is a schematic side view of another containment basin according to an embodiment.

FIG. 10 is a schematic side view of polishing basins and a vacuum pumping system according to an embodiment.

DETAILED DESCRIPTION

Figure 1:
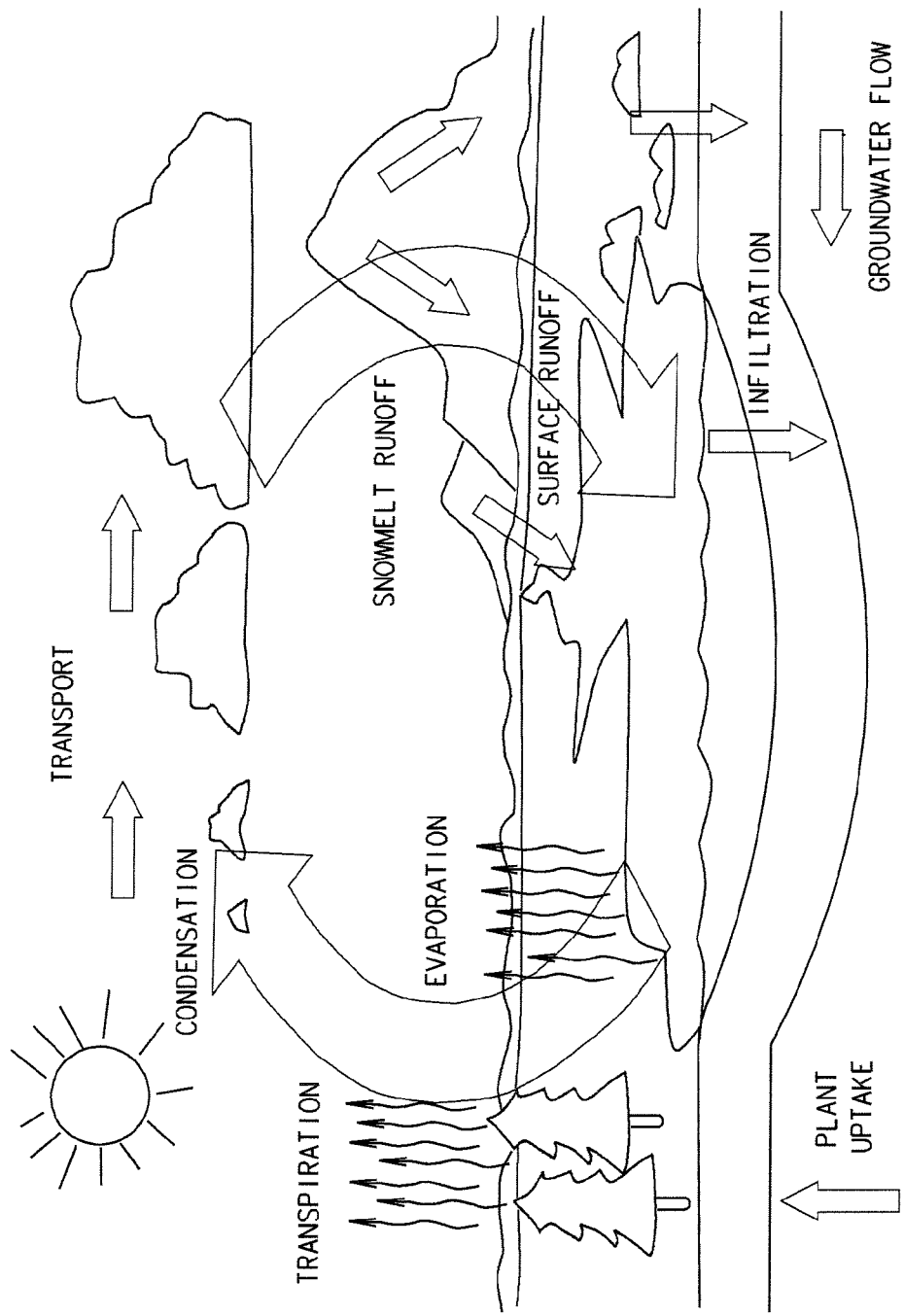
FIG. 1 is a schematic illustration of the evapotranspiration cycle.
Figure 2:
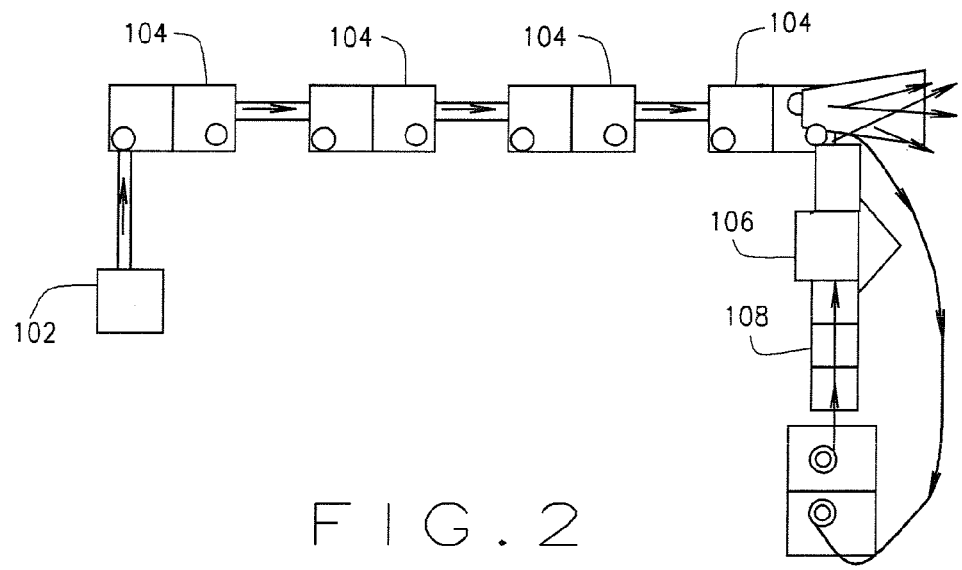
FIG. 2 is a schematic plan view of a land system according to an embodiment of the present invention.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

In brief summary, embodiments of the present invention work by collecting water from runoff and waterways and directing it to containment basins ("CBs"). From these CBs, water is pumped under a vacuum up to one or more polishing basins. The term "polishing" is used herein to refer to the removal of harmful pollutants that prevent the growth of vertebrate and invertebrate organisms in a stream or body of water. By eliminating undesirable chemicals from storm water runoff, the water is "polished". In each PB, there are substrate bags that hold different substrates that are specific for different impurities in the polluted water. After passing through the PBs, the water may be directed to a central concrete containment tank under vacuum where the water can be tested for specific impurities. In some embodiments, the water is then guided to either an open air concrete fish tank loaded with different species of fish or expelled and exposed to limestone rock.

In those embodiments in which polished water is directed to a fish tank to be tested for quality, the fish operate as a control mechanism to test the polished water for any chemical pollutants and to see if the water can sustain vertebrate and invertebrate growth. After polishing, the water has 8-10 parts per million (ppm) $O_2$ and a pH of 6.0-7.8.

Embodiments of the present invention work as two continuous closed-loop systems in two different aspects (land and stream) of the hydrologic cycle. In the land system, water is moved from the surface as storm water to underground concrete containment basins that will go through a vacuum polishing process before it is released from the property into the stream. The stream system takes stream water and pumps it through our polishing process. Half of the polished water is put back into the stream as cleaner water and the other half is further polished and is placed back into the stream as ecologically clean water. These two systems are both continuous polishing loops.

The described embodiment of the present invention incorporates the bicarbonate buffer system ($CO_2$—$HCO_3$—$CO_3^{2-}$) where dissolved $CO_2$ reacts with $H_2O$ to form carbonic acid ($H_2CO_3$), a weak inorganic acid that occurs at low concentrations relative to unhydrated $CO_2$ at pH<8. $H_2CO_3$ further dissociates to form hydrogen (H+), bicarbonate ($HCO_3^-$), and carbonate ($CO_3^{2-}$) ions:

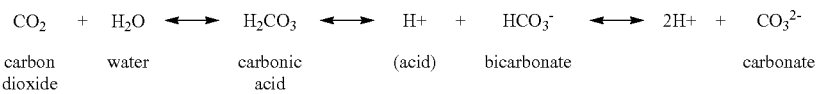

Carbonate ions react with water, forming hydroxyl ions (OH–). When the natural content of carbonate rocks is high, such as sedimentary rocks found in the earth's surface, these reactions result in sufficient hydroxyl ions to produce alkaline water. This reaction is referred to as a bicarbonate buffer system because it resists change in pH. However, as the carbonate ions dissipate, the pH of the water will begin to lower.

Rain is an acid with a pH near 5.7 because of its carbon dioxide content and naturally occurring sulfate. Also, humic acid in decaying plant matter causes a decrease in pH in rainwater runoff ranging from 4-5. In urban areas, runoff of salts and other de-icing compounds applied to roads can greatly elevate the salinity of receiving waters, causing large fluctuations of pH in a short time. The present invention is advantageously based upon the following formula:

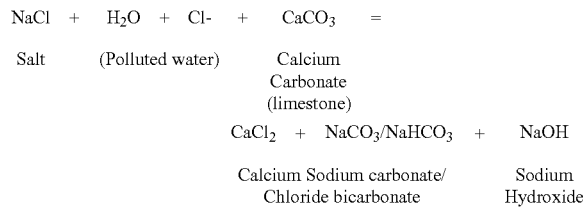

By adding $CaCO_3$ (limestone) rock to the system, unidentified pollutants and street salt will be converted to sodium bicarbonates/carbonates, calcium chloride, and sodium hydroxide which will act to increase the pH to 6.0-7.8 and cause the pollutants in the storm water runoff to be precipitated. As the pH increases, the ability of vertebrates and invertebrates to survive greatly increases.

FIGS. 2-5 schematically illustrate a land system embodiment of the invention. This system addresses run-off, storm water, and water falling from the roofs of buildings. This water is drained into one or more small scale CBs 102. Each CB is partially filled with limestone. Water is guided from the small scale CB 102 to one or more large CBs 104. In preferred embodiments, a series of large CBs 104 is used.

The water flow from the last CB may be divided in half and diverted in different directions. In such embodiments, half of the water is exposed to additional limestone prior to be diverted into a stream, river or other body of water. The remaining water is directed by a vacuum pumping system 106 to an additional CB, which is also partially filled with limestone. The water is then moved from the additional CB to one or a PBs 108, each of which is provided with one or more substrates for further polishing of the water. From this point, the water may again be diverted into two separate directions. In the first direction, water is directed to the previously referenced body of water, via a final pass over a limestone surface. In the second direction, the water is guided into a fish tank for testing on local fish species for system effectiveness monitoring.

Figure 4:
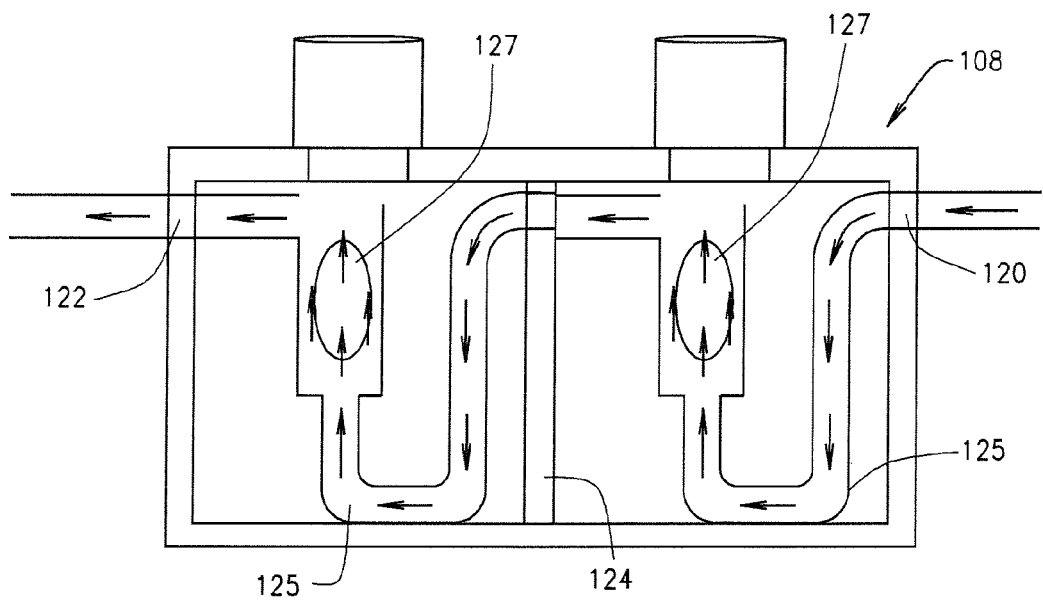
FIG. 4 is a schematic section side view of a polishing basin for use with an embodiment of the invention.
Figure 3:
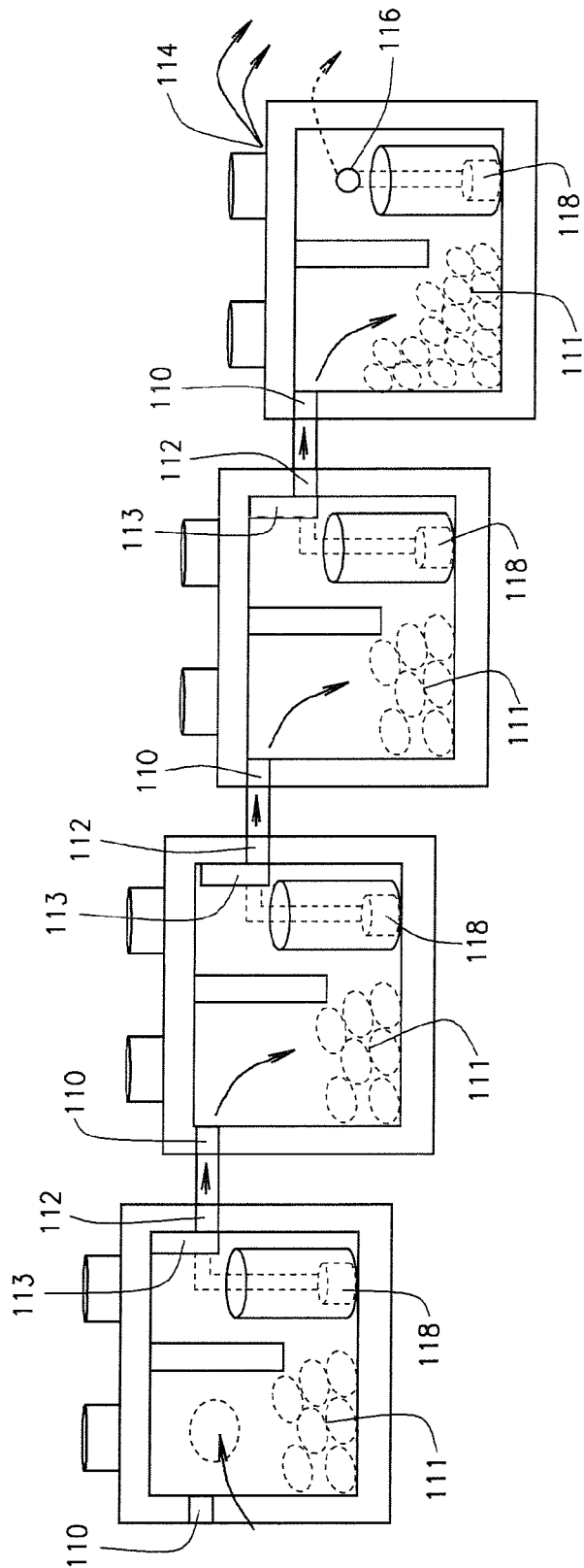
FIG. 3 is a schematic section side view of a series of containment basins suitable for use in an embodiment of the invention.
Figure 5:
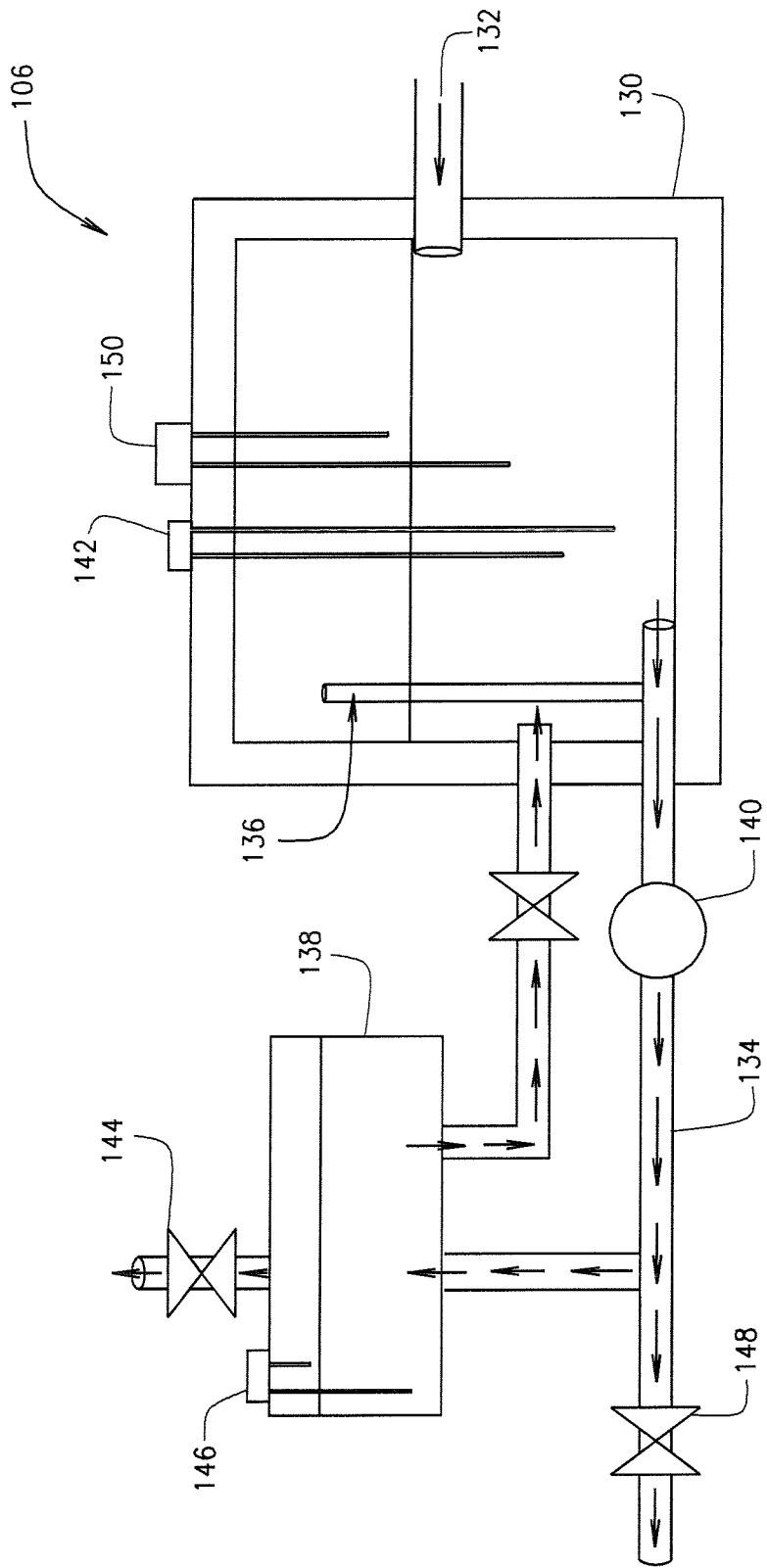
FIG. 5 is a schematic section side view of a vacuum pumping system for use with an embodiment of the invention.
Figure 6:
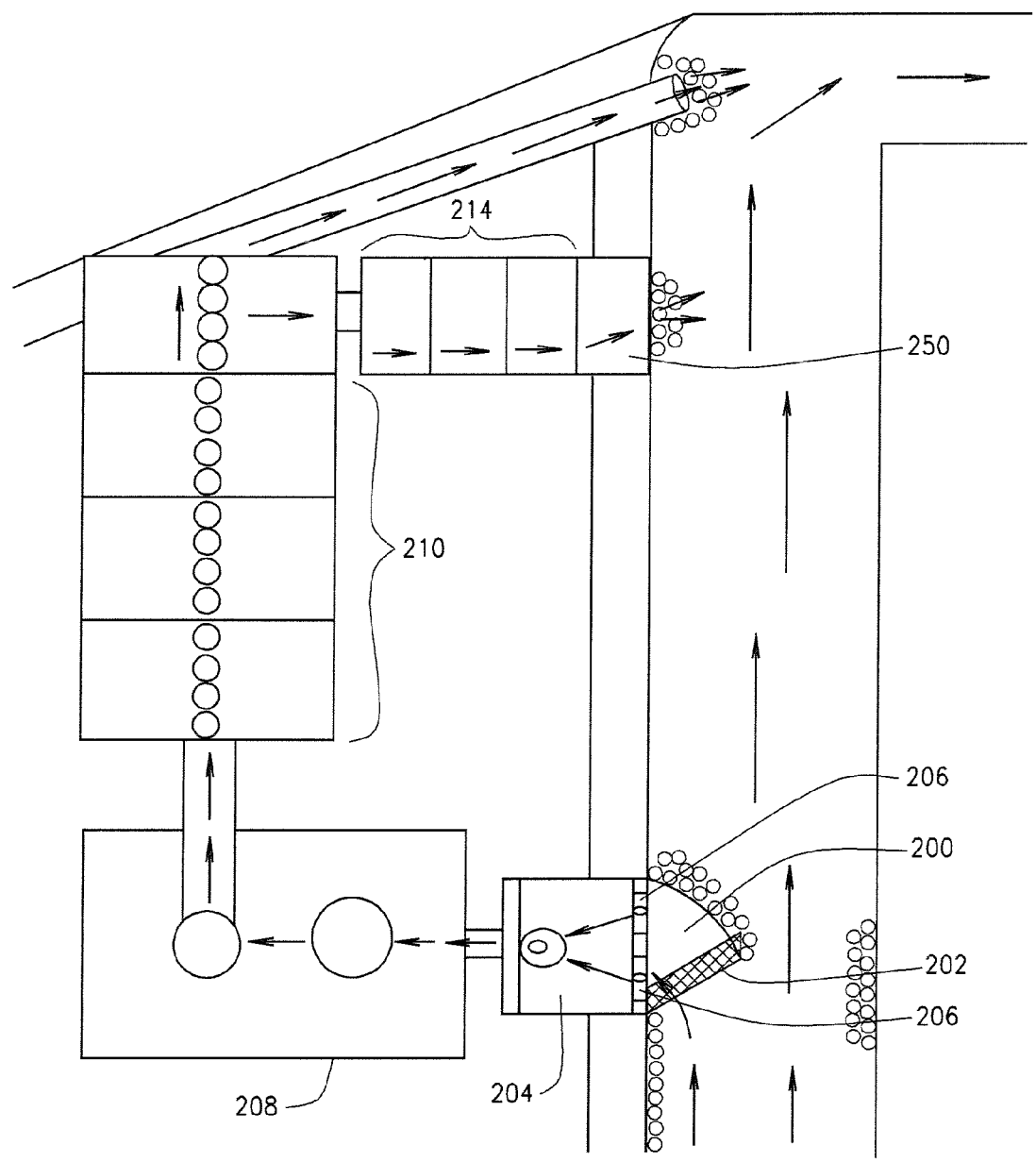
FIG. 6 is a schematic plan view of a stream system according to an embodiment of the present invention.

The basic layout of the CBs 104 is illustrated schematically in FIGS. 4 and 5. Each CB 104 is essentially a rectangular container, preferably formed of concrete. Each CB 104 will have an inlet 110 and an outlet 112. Where a series of CBs 104 are used, the outlet 112 of a preceding CB 104 is connected to the inlet 110 of the next CB 104 by conduit, for example PVC piping. In the case of the last CB 104 in a series, or the sole CB 104 if only one is used, the outlet 112 will actually take the form of two exit orifices. The first orifice 114, which may simply be an opening or an opening filled with a grate, directs water to the aforementioned body of water. The second exit orifice 116 directs water to the vacuum pumping system 106.

The bottom of each CB 104 is lined with limestone rock 111 ($CaCO_3$), the purposed of which is described supra. Each CB 104 is also provided with a pump 118 to move water from the interior of the CB 104 out of its outlet 112. In addition, the CBs 104 may be provided with varying substrates 113 designed to attract and absorb particular contaminants, for example oil or antifreeze.

FIG. 4 schematically illustrates a PB 108 for use in the land system. As with the CBs 104, each PB is a rectangular container or tank, preferably formed from concrete, with an inlet 120 and an outlet 122. Each PB 108 also includes a center baffle wall 124. The center baffle wall 124 divides the interior of the PB 108 into two parts and is provided with an opening therein to allow water to flow from one part of the interior to the other. The opening is preferably at a relatively high point of the baffle wall 124. In a preferred embodiment, the PB 108 is provided with a plumbing conduit 125—schematically indicated in FIG. 4—which positively directs water through the PB 108 from one part of the interior, through the opening in the baffle 124, into the second part of the PB interior, and out through the outlet 122. In either case, the water is exposed to one or more substrates 127 as it passes through the PB interior. The substrates 127 are selected to address specific contaminants relevant to the local environment.

As noted previously, water from the CBs 104 is directed to the PBs 108 by virtue of the vacuum pumping system 106. The vacuum pumping system 106 creates a vacuum throughout the PBs 108 to draw water through those containers. FIG. 5 schematically illustrates an exemplary vacuum pumping system. The vacuum pumping system 106 includes a vacuum tank 130 having an inlet 132 that communicates with the outlet of the last PB 108. An outlet pipe 134 allows water to flow from the vacuum tank 130. A vacuum pump 140 is located in the outlet pipe 134. The vacuum pump 140 is controlled by a switch 142 located in the vacuum tank 130. The outlet pipe leads to both a water outlet valve 148 and an inlet to a separator tank 138 via a T-connection. Another conduit leads from the separator tank 138 back to the vacuum tank 130. The separator tank 138 is provided with a bleed valve 144 that is operated by a switch 146 in the separator tank 138. The water outlet valve 148 is also controlled by a switch 150.

Each of the switches 142, 146, 150 referenced above is an anode/cathode switch in the illustrated embodiment. The switch is opened or closed by contact of the anode or cathode of the switch with water in the system as described below.

The vacuum pumping system 106 described above operates in the following manner. Water is drawn into the vacuum tank 130 by operation of the vacuum pump 140 and gravity. At this time, the water outlet valve 148 is closed to prevent water from exiting the vacuum pumping system. This allows water to build up in the vacuum tank 130 and the separator tank 138. As water flows into the separator tank, it contacts the bleed valve switch 146 anode, which opens the bleed valve 144 to allow air in the vacuum pumping system 106 to escape to atmosphere. Water in the separator tank 138 flows through the connecting conduit back to the vacuum tank 130, but at a rate slower than the rate of flow into the separator tank 138. The water level in the separator tank 138 thus rises and contacts the cathode of the bleed valve switch 146 to close the bleed valve 144. Air in the system is released through the stand pipe 136, and a vacuum in the system is created. As water continues to build in the vacuum tank 130, it reaches the cathode of the water outlet valve switch 150, resulting in the water outlet valve 148 being opened and allowing water to flow out of the vacuum tank 130 until the water level in the tank 130 drops below the cathode of the valve switch 150, which closes the water outlet valve 148 and allows water to build up once again within the vacuum tank 130.

FIGS. 6-10 schematically illustrate a "stream" system embodiment of the invention. It should be appreciated that the foregoing reference to "stream" is solely for the sake of convenience and that the described embodiment is intended for use with other waterways, such as rivers, tributaries, lakes, etc. This system draws water from the waterway for polishing before returning it to the waterway farther downstream. A collection chamber 200 collects water from the waterway. A grate 202 at the front of the collection chamber 200 serves as a rough filter to minimize entry of large debris into the system. Further, in a preferred embodiment, the grate 202 is positioned at roughly a 45° angle to the flow direction of the waterway to further minimize blockage by large debris. The collection chamber 200 directs water from the waterway to a holding tank 204. Entry into the holding tank 204 is controlled by levered doors 206, which allow the flow rate into the holding tank 204 to be regulated by raising and lowering the doors 206 to specific heights.

The holding tank 204 is provided with a controlled drain that allows water to flow to a pump tank 208. The water is moved from the pump tank 208 to one or a series of CBs 210 containing limestone 212 and, in some embodiments, other substrates. From the final CB 210, water is directed either back to the stream or to PBs 214 for further processing before being returned to the waterway.

The pump tank 208 includes an inlet 222 to allow the flow of water from the holding tank 204. The pump tank 208 may be divided into two or more compartments 216 by a combination of baffles 218 and debris dividers 220. The debris dividers 220 are advantageously arranged to collect smaller debris. In a preferred embodiment, the debris dividers 220 are stainless steel. Limestone 212 may be provided in the final compartment of the pump tank 208. The pump tank 208 is further provided with an outlet 224 and a water pump 226 in communication with the outlet 224 to draw water from the pump tank 208 and pass it to the CBs 210. In one embodiment, the pump 226 is a 30 hp, 3-phase pump.

The CBs 210 to which the water flows next are similar in structure to those described in the land system. Again, the preferred construction for these CBs 210 is concrete, although there are numerous suitable alternate materials. Like the pump tank 208, the CBs 210 are divided into two or more compartments 228 through the use of baffles 230 and debris dividers 232. Each of the compartments 228 is lined with limestone 212. In addition, one or more compartments 228 may be provided with substrates 234 for collecting specific impurities, such as oil and anti-freeze. The substrate 234 may be contained within a bag or other structure. In preferred embodiments, there is a manhole 236 in the top surface of the CB 210 above each compartment 228 for cleaning and maintenance. In the final CB 210—shown in FIG. 9, the outlet 224 includes first 238 and second 240 exit orifices. The first orifice 238 is connected with a conduit to deliver water back to the waterway. The second exit orifice 240 directs water to the PBs 214.

FIG. 10 provides a schematic illustration of a series of PBs 214 that may be used in various embodiments of the system. As can be readily seen from the illustration, the PBs 214 of the stream system utilize a basic structure that is similar to that of the land system PBs in that each PB 214 may be divided into two compartments 242 by a roughly central baffle wall 244. Each compartment 242 may be provided with an allocation of limestone 212 or a pollutant collection substrate 234. In the illustrated embodiment, the final PB 214 is provided with a single compartment filled with limestone 212 for final polishing.

As indicated in FIG. 10, water is moved through the PBs 214 by virtue of a vacuum pumping system 250. The vacuum pumping system 250 of the illustrated stream system embodiment is essentially identical in structure and function to the land system vacuum pump described above.

Figure 11:
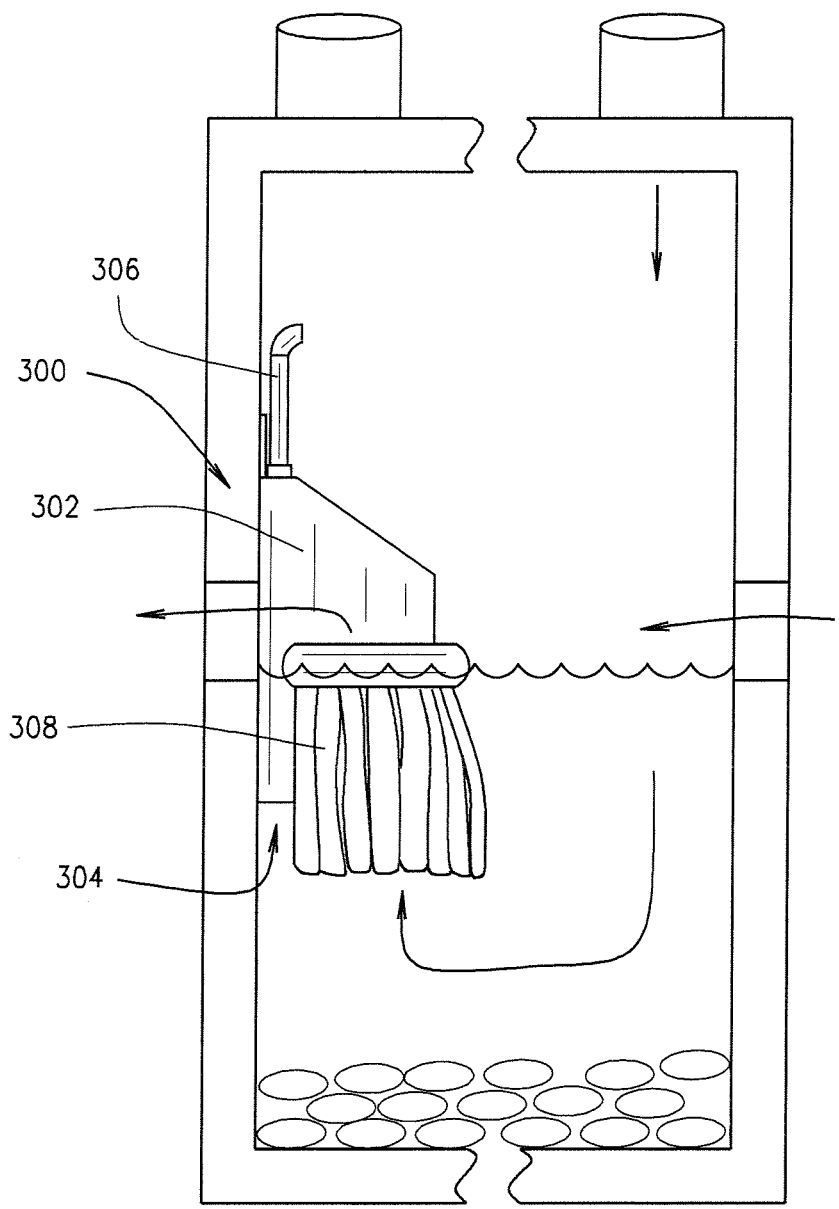
FIG. 11 is a schematic side view of a mechanical contaminant separation device suitable for use in an embodiment of the present invention.

In preferred embodiments of both the stream and land systems described above the outlets of the various containment and polishing basins are provided with a mechanical contaminant separation device 300, an example of which is illustrated in FIG. 11. The separation device 300 includes a housing 302 that is secured to the wall of the basin surrounding the basin outlet. The housing 302 is provided with an open bottom 304. The housing 302 is arranged such that it extends below the water line within the basin by at least several inches. This arrangement allows water to enter the housing 302 only through the open bottom 304. Furthermore, water from the top few inches of the basin, which contains a majority of contaminants as they tend to float to the surface, is prevented from flowing through the basin outlet. Thus, the device 300 traps contaminants within the basin while allowing cleaner water to pass to the basin outlet. The contaminants can be skimmed from the surface of the water in the basin periodically. The housing 302 also has a vent opening 306 at the top of the housing to prevent a siphon from forming in the system.

In addition, the device 300 may include an anti-microbial skirt 308 that surrounds the open bottom 304 of the housing 302. The anti-microbial properties of the skirt 308 reduce bacteria in the water, while the skirt 308 adsorbs hydrocarbons from the water. The skirt 308 can be replaced periodically as it becomes fully saturated with contaminants.

An example of a suitable housing 302 and anti-microbial skirt 308 are the Best Management Products SNOUT® and BIO-SKIRT®. These exemplary products are described in U.S. Pat. Nos. 6,126,817 and 7,857,966, which are each incorporated by reference herein.

Those of skill in the art will recognize that one of the inherent advantages of the present invention is its adaptability for different applications and size requirements. The system described herein may be scaled up or down in size for use in single lot, commercial development, or whole city applications. While the land and stream systems may be utilized in combination, either system may be used in isolation as well.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiments, but should be defined only in accordance with the following claims appended hereto and their equivalents.

What is claimed is:

1. A self-contained water polishing system, comprising:
at least a first containment basin, said containment basin having an inlet for inflow of water from a collection source and containing calcium carbonate for treatment of water flowing through said polishing system;
at least a first polishing basin, said polishing basin containing at least a first pollutant collection substrate for treatment of water flowing through said polishing system, said polishing basin being in fluid communication with said containment basin;
a vacuum pumping system in fluid communication with said polishing basin and said containment basin and operable to draw water through said polishing system; and
an exterior calcium carbonate surface positioned outside of said first containment basin and said first polishing basin and over which said water is directed prior to discharge from said polishing system.

2. A self-contained water polishing system, comprising:
at least a first containment basin, said containment basin having an inlet for inflow of water from a collection source and containing calcium carbonate for treatment of water flowing through said polishing system;
at least a first polishing basin, said polishing basin containing at least a first pollutant collection substrate for treatment of water flowing through said polishing system, said polishing basin being in fluid communication with said containment basin;
a vacuum pumping system in fluid communication with said polishing basin and said containment basin and operable to draw water through said polishing system; and
a mechanical contaminant separation device surrounding and controlling access to an outlet of at least one of said first containment basin and said first polishing basin.

3. The self-contained water polishing system as set forth in claim 2, wherein said mechanical contaminant separation device further comprises a housing, said housing surrounding said outlet and extending below a water line within said first containment basin or said first polishing basin; a vent in said housing; and an anti-microbial skirt surrounding at least a lower portion of said housing.

4. A self-contained water polishing system, comprising:
a run-off water polishing system, said run-off water polishing system further comprising:
at least one collection container;
a first containment basin, said first containment basin being in fluid communication with said collection container via an inlet and said first containment basin being lined with calcium carbonate for treatment of water flowing through said run-off water polishing system;
a first polishing basin, said first polishing basin being in fluid communication with said first containment basin and said first polishing basin containing at least a first pollutant collection substrate for treatment of water flowing through said run-off water polishing system; and
a first vacuum pumping system in fluid communication with said first polishing basin and said first containment basin and operable to draw water through said run-off water polishing system;
a flowing water polishing system, said flowing water polishing system further comprising:
a collection chamber arranged in the path of flowing water;
a second containment basin, said second containment basin being in fluid communication with said collection chamber via an inlet and said second containment basin being lined with calcium carbonate for treatment of water flowing through said flowing water polishing system;
a second polishing basin, said second polishing basin being in fluid communication with said second containment basin and said second polishing basin containing a second pollutant collection substrate for treatment of water flowing through said flowing water polishing system; and
a second vacuum pumping system in fluid communication with said second polishing basin and said second containment basin and operable to draw water through said flowing water polishing system.

5. The self-contained water polishing system as set forth in claim 4, wherein said calcium carbonate in said first and second containment basins is provided in the form of limestone rock.

6. The self-contained water polishing system as set forth in claim 4, wherein said first and second polishing basins are also lined with calcium carbonate.

7. The self-contained water polishing system as set forth in claim 4, wherein said first and second containment basins further contain first and second pumps, respectively, for directing water from said first containment basin to one of the group consisting of: a third containment basin and said first polishing basin; and from said second containment basin to one of the group consisting of: a fourth containment basin and said second polishing basin.

8. The self-contained water polishing system as set forth in claim 4, wherein said first containment basin is provided with a vertical baffle wall separating an interior of said first containment basin into first and second compartments, said vertical baffle wall defining at least one opening therein to allow for movement of water from said first compartment to said second compartment.

9. The self-contained water polishing system as set forth in claim 4, wherein said second containment basin is provided with a vertical baffle wall separating an interior of said second containment basin into first and second compartments, said vertical baffle wall defining at least one opening therein to allow for movement of water from said first compartment to said second compartment.

10. The self-contained water polishing system as set forth in claim 4, wherein said first polishing basin is provided with a vertical baffle wall separating an interior of said first polishing basin into first and second compartments, said vertical baffle wall defining at least one opening therein to allow for movement of water from said first compartment to said second compartment.

11. The self-contained water polishing system as set forth in claim 10, wherein said first pollutant collection substrate is positioned in said first compartment.

12. The self-contained water polishing system as set forth in claim 10, wherein said first polishing basin further comprises at least one plumbing conduit traversing said interior of said first polishing basin to direct water flowing through said first polishing basin through said first compartment, through said opening in said vertical baffle wall, and through said second compartment.

13. The self-contained water polishing system as set forth in claim 4, wherein said second polishing basin is provided with a vertical baffle wall separating an interior of said second polishing basin into first and second compartments, said vertical baffle wall defining at least one opening therein to allow for movement of water from said first compartment to said second compartment.

14. The self-contained water polishing system as set forth in claim 13, wherein said second pollutant collection substrate is positioned in said first compartment.

15. The self-contained water polishing system as set forth in claim 13, wherein said second polishing basin further comprises at least one plumbing conduit traversing said interior of said second polishing basin to direct water flowing through said first polishing basin through said first compartment, through said opening in said vertical baffle wall, and through said second compartment.

16. The self-contained water polishing system as set forth in claim 4, wherein said water travels through said first polishing basin under at least a partial vacuum created by said first vacuum pumping system.

17. The self-contained water polishing system as set forth in claim 4, wherein said water travels through said second polishing basin under at least a partial vacuum created by said second vacuum pumping system.

18. The self-contained water polishing system as set forth in claim 4, further comprising an exterior calcium carbonate surface positioned outside of said first containment basin and said first polishing basin and over which said water is directed prior to discharge from said run-off water polishing system.

19. The self-contained water polishing system as set forth in claim 4, further comprising a mechanical contaminant separation device surrounding and controlling access to an outlet of at least one of said first containment basin, said second containment basin, said first polishing basin, and said second polishing basin.

20. The self-contained water polishing system as set forth in claim 4, wherein said mechanical contaminant separation device further comprises a housing, said housing surrounding said outlet and extending below a water line within said first containment basin or said first polishing basin; a vent in said housing; and an anti-microbial skirt surrounding at least a lower portion of said housing.

\* \* \* \* \*